June 18, 1929.   P. W. PALM   1,717,732
AUXILIARY WHEEL RIM
Filed Jan. 17, 1928   2 Sheets-Sheet 1

Inventor
P. W. Palm.
By Lacey & Lacey, Attorneys

June 18, 1929.  P. W. PALM  1,717,732
AUXILIARY WHEEL RIM
Filed Jan. 17, 1928  2 Sheets-Sheet 2
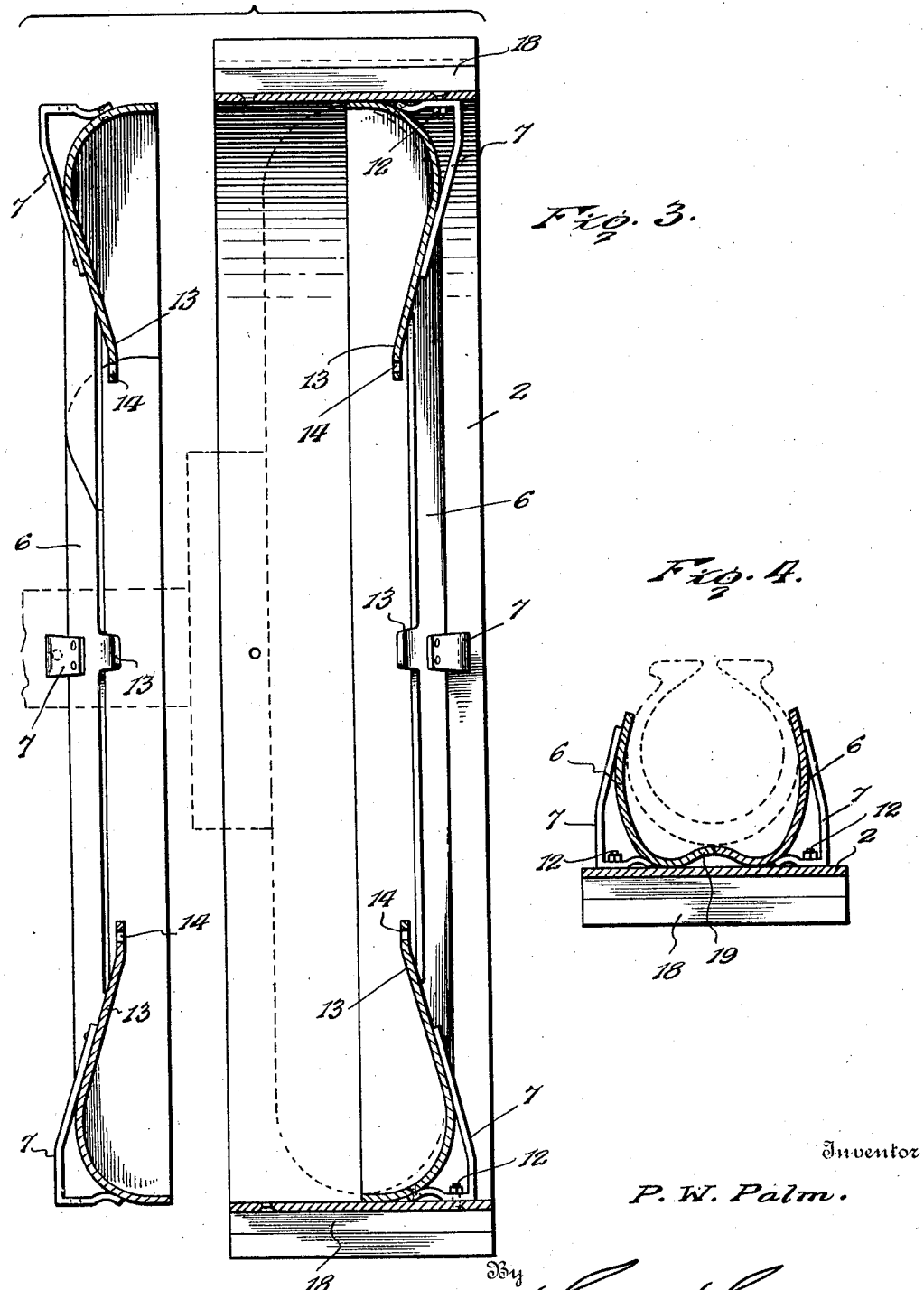

Patented June 18, 1929.

1,717,732

UNITED STATES PATENT OFFICE.

PER WILHELM PALM, OF BAUDETTE, MINNESOTA.

AUXILIARY WHEEL RIM.

Application filed January 17, 1928. Serial No. 247,435.

This invention relates to vehicle wheels and more particularly to an auxiliary rim adapted to be applied to a wheel in enclosing relation to a pneumatic tire carried by the wheel.

One object of the invention is to provide an auxiliary rim which may be easily applied to a wheel and permit the vehicle to move across snow, ice, mud or sand without the wheels slipping and failing to firmly grip the ground.

Another object of the invention is to form the auxiliary rim of sections which may be readily assembled about the felly and tire of a wheel and thereby allow the auxiliary rim to be applied to the wheel either when upon an axle or removed therefrom.

Another object of the invention is to provide improved means to brace inner and outer walls of the auxiliary rim and firmly but removably connect the wall with an annular tread band forming part of the auxiliary rim.

Another object of the invention is to so shape the walls that a pneumatic tire may be allowed to expand transversely when subjected to shocks during movement of a vehicle over rough ground.

The invention is illustrated in the accompanying drawings, wherein

Fig. 3 is a transverse sectional view through the auxiliary rim with one of the side walls thereof detached, and Fig. 4 is a transverse sectional view illustrating a modified form of auxiliary rim.

Figure 1:
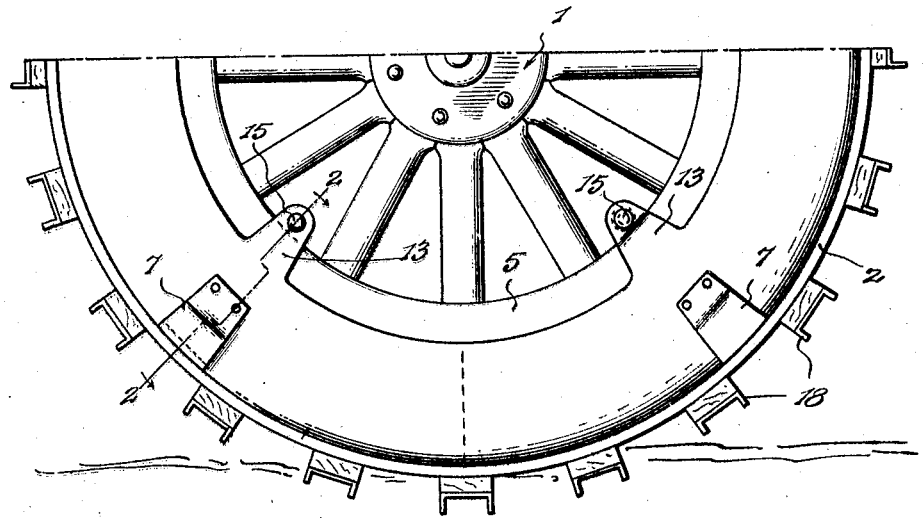
Figure 1 is a side elevation showing a portion of a wheel with the improved auxiliary rim applied thereto.
Figure 2:
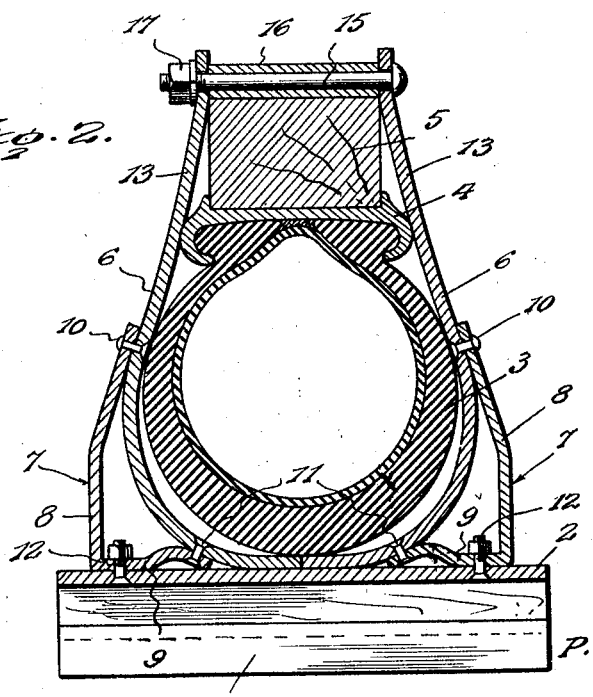
Fig. 2 is a transverse sectional view through the wheel and auxiliary rim taken on the line 2—2 of Fig. 1.

The improved auxiliary rim is intended to be applied to a wheel of a conventional construction, a portion of which is shown in Fig. 1 and indicated in general by the numeral 1. This rim includes a tread band 2 which is formed of strong metal and is circular in shape. Its internal diameter is such that it may fit easily about the wheel to which it is to be applied in encircling relation to a tire 3 carried by the rim 4 of the wheel. This rim 4 is of a conventional construction and secured upon the felly 5 of the wheel in any desired manner. The side walls 6 of the auxiliary rim are also formed of strong sheet metal and in cross section are shaped as shown in Figs. 2 and 3 so that they will fit about the tire 3 with their inner side portions bearing against the inner surface of the tread band 2 and extending towards each other and contacting intermediate the width of the tread band. By referring to Fig. 2, it will be seen that the side walls are of such contour in cross section that they are spaced from the side portions of the tire thereby providing ample room for the tire to expand transversely when subjected to shocks as the wheel moves over rough ground. It will thus be seen that the auxiliary wheel rim, when in use, does not detract from the resiliency of the pneumatic tire or impair its shock absorbing qualities. Each of the side walls carries brackets 7 which are disposed radially of the wheel and project outwardly from the side walls. Any desired number of these brackets may be employed and each consists of a strip of strong metal bent intermediate its ends to provide diverging arms 8 and 9 secured respectively to the side and tread portions of the wall by rivets or other suitable fasteners 10 and 11. The arms 9 extend transversely across the tread band 2 and adjacent the arm 8 are formed with openings through which bolts or equivalent removable fasteners 12 are passed so that the walls may be firmly secured to the tread band but permitted to be released and removed when necessary. It should also be noted that the free end portions of the arms 9 are curved longitudinally, as clearly shown in Fig. 2, so that they will have good contacting engagement with the walls and may be firmly secured thereto by the rivets 11. Arms or tongues 13 project inwardly from the walls radially of the wheel and have their free end portions formed with openings 14 to receive securing bolts 15. Any number of arms 13 desired may be provided for each wall but the arms of the two walls are disposed opposite each other and are of such length that their free end portions will project beyond the felly of the wheel, as shown in Figs. 1 and 2, so that the securing bolts 15 may extend across the felly between the spokes of the wheel. A sleeve 16 is placed upon each bolt 15 so that, when the securing nut 17 of the bolt is tightened, the arms 13 may be firmly clamped against the ends of the sleeve but prevented from being drawn toward each other to such an extent that they will bind against the opposite sides of the felly 5 and rim 4 and prevent the pneumatic tire from absorbing shocks.

When the improved auxiliary rim is to be applied, the wheel may be left upon its axle or removed therefrom. One of the side walls is in the form of arcuate sections which have end to end engagement with each other, as shown in Fig. 3, and it will be readily seen that, when the securing bolts 12 passed through the brackets of this wall are removed, its sections will be released from the tread band and may be separated from each other. Therefore, the tread band and the second wall may be easily slipped into place about a wheel and tire carried thereby and the sections of the first wall replaced. Since the first-mentioned or inner side wall of the auxiliary rim is formed in sections, the axle and the brake drum of a wheel will not prevent this wall from being easily set in place. It will be obvious that, if the wheel is removed from its axle before the auxiliary rim is applied, either wall may be released in order to apply the rim to the wheel. After the wall has been replaced and again secured to the tread band, the bolts 15 together with their sleeves 16 are put in place and the securing nuts of these bolts tightened. When so applied, the auxiliary rim will be securely held upon the wheel in enclosing relation to the tire and since the tread band is equipped with cleats 18 the auxiliary rim will have firm gripping engagement with snow, ice or slippery ground and the wheels will not be allowed to rotate without propelling the vehicle.

In Fig. 4, there has been shown a slightly modified construction. Referring to this figure, it will be seen that the portions of the side walls which extend towards each other in contacting engagement with the inner surface of the tread band have their marginal portions bent away from the tread band thereby providing a rib 19 which is arcuate in cross section. This rib which extends entirely about the auxiliary rim has contacting engagement with the tread surface of the tire and spaces the tire well away from the sides and adjacent tread portions of the auxiliary rim. When this construction is employed, the tire may expand freely when subjected to shocks and there will be no danger of its shock absorbing qualities being impaired.

Having thus described the invention, I claim:

An auxiliary wheel rim comprising a circular tread band, inner and outer annular walls encircled by said band and having portions extending towards each other against the inner surface of the band and then bowed away from the band to form a tire-engaging rib extending circumferentially within the auxiliary rim, and means removably securing the walls to the band.

In testimony whereof I affix my signature.

PER WILHELM PALM. [L. S.]